United States Patent [19]

Chandalia et al.

[11] Patent Number: 5,360,642

[45] Date of Patent: Nov. 1, 1994

[54] LOW VOC, MOISTURE CURABLE, ONE-COMPONENT COATING COMPOSITIONS BASED ON ORGANIC POLYISOCYANATE PREPOLYMERS

[75] Inventors: Kiran B. Chandalia, Cheshire; Michael J. Morgan, Torrington, both of Conn.; Michael M. Martinez, Fairporte, N.Y.; James M. O'Connor, Branford; Stephen P. Noe, Fairfield, both of Conn.

[73] Assignee: Olin Corporation, Cheshire, Conn.

[21] Appl. No.: 65,005

[22] Filed: May 24, 1993

[51] Int. Cl.$^5$ ............................................... B05D 3/02
[52] U.S. Cl. .................... 427/385.5; 428/422.8; 428/423.1; 528/75
[58] Field of Search ........... 427/385.5; 428/422.8, 428/423.1; 528/75

[56] References Cited

U.S. PATENT DOCUMENTS

| | | | |
|---|---|---|---|
| 4,292,350 | 9/1981 | Kubitza et al. | 427/385.5 |
| 4,394,491 | 7/1983 | Hoffman | 528/75 X |
| 4,456,658 | 6/1984 | Kubitza et al. | 428/424.6 |
| 4,513,124 | 4/1985 | Hoffman | 528/75 X |
| 4,772,643 | 9/1988 | Erast et al. | 528/123 X |
| 4,801,675 | 1/1989 | Pedain et al. | 528/73 |
| 4,981,730 | 1/1991 | Zaleski | 427/393.5 |
| 5,144,031 | 9/1992 | Pedain | 544/193 |
| 5,237,058 | 8/1993 | Laas et al. | 528/45 X |

*Primary Examiner*—Michael Lusignan
*Attorney, Agent, or Firm*—Dale Lynn Carlson

[57] ABSTRACT

This invention relates to a process for coating a substrate which comprises contacting the substrate with a low volatility organic (so-called "low VOC") coating composition having a viscosity as measured by ZAHN cup 2 of less than about 200 seconds and consisting essentially of at least one polyisocyanate prepolymer which is the reaction product of a polyisocyanate with an active hydrogen-containing compound selected from the group consisting of monoahls, polyols, imines, oxazolidines, and combinations thereof, a solvent in an amount of between 0% and 45% by weight based upon the amount of said polyisocyanate in said composition, and a tertiary amine catalyst, said composition being essentially free of any volatile mono- and di-isocyanates, and said composition being moisture curable upon exposure to atmospheric moisture. Also claimed is the coating composition itself.

9 Claims, No Drawings

LOW VOC, MOISTURE CURABLE, ONE-COMPONENT COATING COMPOSITIONS BASED ON ORGANIC POLYISOCYANATE PREPOLYMERS

FIELD OF THE INVENTION

This invention relates generally to moisture-curable coating compositions, and, more specifically to a process for coating substrates, with a low volatile organic (so-called "low VOC") coating composition which is suitably hardened under the influence of atmospheric moisture.

BACKGROUND OF THE INVENTION

One-component, moisture-curable, isocyanate-based coating formulations are well-known and are widely used. Generally, these compositions are based on isocyanate-terminated prepolymers and have a viscosity sufficiently high as to make application to substrates, especially by such techniques as spraying, readily achievable only by dilution with a solvent or solvent mixture to solids levels of 50% or less. However, due at least in part to the introduction of the Clean Air Act of 1970, coatings formulators are under pressure to reduce volatile organic compounds ("VOC") to as low a level as technological advances will allow. Therefore, it would be highly desirable to provide coatings with excellent properties associated with moisture-curable, isocyanate-based coatings, but which are inherently low in viscosity and require minimal or no dilution with solvent.

The use of one-component, isocyanate-based coating compositions in the production of coatings for substrates is known in the art. By way of illustration, U.S. Pat. No. 4,456,658 discloses a process for coating polyvinyl chloride sheet products with a clear coating comprising a binder which consists essentially of at least one polyisocyanate which is liquid at room temperature. The polyisocyanate binder is further characterized at column 2, lines 12–17 of the '658 patent as being in particular polyisocyanates containing biuret or isocyanurate groups and optionally uretidione groups and having an average isocyanate functionality above 2, preferably from about 2.5 to 6. Unfortunately, the '658 patent is limited to coating polyvinyl chloride sheet products, which represents a narrow market niche as compared to the wide variety of substrates in the marketplace that could benefit from a suitable one-component coating. The coating compositions of the examples of the '658 patent also have the disadvantage of slow drying times when cured at room temperature.

As an additional illustration, U.S. Pat. No. 4,292,350 discloses a process of coating substrates comprising applying a solvent-free or low solvent lacquer composition containing as a binder an isocyanate mixture. The isocyanate mixture described in the '350 patent is a mixture of (a) an organic polyisocyanate having an average isocyanate functionality of greater than 2 which contains biuret, urethane and/or isocyanurate groups and has an isocyanate content of from about 13 to 30% by weight, and (b) at least one monoisocyanate having a defined structure. The monoisocyanate is further described at column 3, lines 18–22 of the '350 patent as being suitably prepared by reacting excess quantities of a diisocyanate with a hydrocarbon-containing hydroxyl compound, followed by removal of unreacted excess diisocyanate by distillation using, for example, a thin layer evaporator. The process of this patent is more cumbersome than might be desired, particularly in regard to the need for the isocyanate mixture and the need for removal of excess diisocyanate from the prepared monoisocyanate component. In addition, the inclusion of monoisocyanate provides a chain-stopper and prevents a build-up of high molecular weight during the coating cure.

As yet another illustration, U.S. Pat. No. 5,144,031 discloses discloses both heat-crosslinkable, one-component blocked-isocyanate compositions and two-component coating compositions which are said to harden at room temperature or at a slightly elevated temperature. The coating compositions of the '031 patent contain isocyanurate group-containing polyisocyanates produced by the steps of: (a) partially trimerizing the isocyanate groups of a cycloaliphatic diisocyanate in the presence of a trimerization catalyst and optionally in the presence of an inert solvent, (b) terminating the trimerization reaction at the desired degree of trimerization, (c) removing unreacted starting diisocyanate and any other volatile constituents, and (d) prior to step (c), adding 1 to 30 % by weight of a monohydric alcohol, based upon the weight of the diisocyanate. Unfortunately, this process is more complicated than might be desired, particularly with the requirement for the step (c) removal of unreacted starting diisocyanate after addition of the monohydric alcohol.

As yet another illustration, U.S. Pat. No. 4,801,675 discloses the preparation of prepolymers containing free isocyanate groups and having an isocyanate content of 1 to 16% by weight and said to be useful as binders in one-component lacquers. These prepolymers are made using a polyhydroxyl component having a hydroxyl functionality of about 1.8 to 5.

A simpler process for coating a wide variety of substrates, not limited to the polyvinyl chloride substrate of the '658 patent and not employing the isocyanate mixture of the '350 patent, but which is simpler to carry out than the process of the '031 patent and which utilizes a room temperature coating composition employing a lower functionality polyol than that used in the '675 patent and having a fast drying time would be highly desired by the one-component urethane coatings community. The present invention provides such a simplified process.

SUMMARY OF THE INVENTION

In one aspect, the present invention relates to a process for coating a substrate which comprises contacting the substrate with a low volatile organic compounds-containing (so-called "low VOC") coating composition having a viscosity as measured by ZAHN cup 2 of less than about 200 seconds (preferably between about 10 seconds and about 150 seconds, most preferably between about 10 and about 100 seconds) and consisting essentially of at least one polyisocyanate prepolymer which is the reaction product of a polyisocyanate with an active hydrogen-containing compound selected from the group consisting of monoahls, polyols, imines (such as kerimines and aldimines), oxazolidines, and combinations thereof, a solvent in an amount of between 0% and 45% (preferably between 0% and 35%, most preferably between 0% and about 30%) by weight based upon the amount of said composition, and a tertiary amine catalyst, said composition being essentially free of any volatile mono- and di-isocyanates, and said composition being moisture curable upon exposure to atmospheric moisture.

In another aspect, the present invention relates to a low volatile-organics coating composition having a viscosity as measured by ZAHN cup 2 of less than about 200 seconds (preferably between about 10 seconds and about 150 seconds, most preferably between about 10 and about 100 seconds) and consisting essentially of at least one polyisocyanate prepolymer which is the reaction product of a polyisocyanate with an active hydrogen-containing compound selected from the group consisting of monoahls, polyols, imines (such as ketimines and aldimines), oxazolidines, and combinations thereof, a solvent in an amount of between 0% and 45% (preferably between 0% and 35%, most preferably between 0% and about 30%) by weight based upon the amount of said composition, and a tertiary amine catalyst, said composition being essentially free of any volatile mono and di-isocyanates, and said composition being moisture curable upon exposure to atmospheric moisture.

These and other aspects will become apparent upon reading the following detailed description of the invention.

DETAILED DESCRIPTION OF THE INVENTION

The present invention provides a so-called "one-component" coating composition that has a very low VOC and is useful for coating a wide variety of substrates. The coating composition consists essentially of a polyisocyanate, a tertiary amine catalyst to facilitate moisture cure of the composition, and an optional solvent.

The viscosity of the coating composition is measured using the ZAHN cup 2 test. This test is performed in accordance with ASTM D4212-88. Briefly, the ZAHN cup 2 test is performed by dipping a measured cup having a bottom hole into the test composition, followed by removal of the cup and measurement of the amount of time in seconds until a break occurs in the flow stream of test composition passing through the bottom hole. For purposes of comparison, the viscosities as measured by Zahn cup No. 2 can be converted to approximate kinematic viscosities, if desired, by a computation using the following equation:

viscosity (in centistokes)=$2.93(t)-500/(t)$ where t is the viscosity in seconds as measured by the Zahn cup No. 2 test regimen.

The polyisocyanates useful in the process of the present invention are those containing one or more of the following: biuret groups, isocyanurate groups (such as cyclotrimerized isocyanurate groups), uretidione groups, allophanate groups, urethane groups and combinations thereof. The polyisocyanate suitably has an average functionality of at least 2, preferably between 2.5 and 6, most preferably between 3 and 6. Suitable polyisocyanates include aliphatic polyisocyanates, aromatic polyisocyanates, and combinations thereof, but preferably at least some amount of an aliphatic polyisocyanate is employed in the process of the present invention. Polyisocyanates containing aliphatically and/or cycloaliphatically bound isocyanate groups are preferred for the production of light-stable coatings.

The polyisocyanates are prepared by the known modification of simple organic diisocyanates, typically resulting in the formation of biuret, uretidione, isocyanurate, urethane or allophanate groups, or the simultaneous formation of various of these groups. Any excess of unmodified monomeric starting diisocyanate still present after the modification reaction is suitably removed in a known manner, such as distillation preferably using wiped-film evaporation, to provide a polyisocyanate that is essentially free of volatile diisocyanate. The term "essentially free of volatile diisocyanate" as used herein is intended to designate that the polyisocyanate contains no greater than 0.7%, preferably no greater than 0.5%, most preferably no greater than 0.2%, by weight of volatile diisocyanate based upon the weight of the polyisocyanate.

Diisocyanates suitable for use in the preparation of the polyisocyanates include, for example, 2,4- and/or 2,6 diisocyanatotoluene, 4,4′-diisocyanato-dicyclohexylmethane, hexamethylene diisocyanate ("HDI"),and 1-isocyanato-3,3,5-trimethyl-5-isocyanatomethylcyclohexane ("IPDI"), 1,4-butanediisocyanate, 1-methyl-2,4-diisocyanatocyclohexane, 1-methyl-2,6-diisocyanatocyclohexane, 4,4′-methylene-bis(cyclohexyl isocyanate), 2-methyl-1,5-diisocyanatopentane, 2-ethyl-1,4-diisocyanatobutane, 2,4,4-t rimethylhexamethylene-1,6-diisocyanate, a,a′-diisocyanato- 1,3 -dimethylbenzene, a,a′-diisocyanato-1,3-dimethylcyclohexane, a,a′-diisocyanato- 1,4-dimethylbenzene, a,a′-diisocyanato-1,4-dimethylcyclohexane, 1,3-diisocyanatocyclohexane, 1,4- diisocyanatocyclohexane, wherein "a" as a prefix in the above compounds denotes "alpha". The polyisocyanates may also be suitably prepared from mixtures of these, or other, diisocyanates, and mixtures of a polyisocyanate with a non-volatile isocyanate, such as octadecyl-isocyanate, are also suitable for use within the scope of the present invention. Preferably, aliphatic or cycloaliphatic diisocyanates are utilized as starting materials for preparing the polyisocyanates. HDI and IPDI are the most preferred starting materials for the preparation of polyisocyanates. Thus, most preferred polyisocyanates include tris-(isocyanatohexyl)-biuret, tris-(isocyanatohexyl)-isocyanurate, cyclodimerized HDI and mixtures thereof, as well as mixtures of these oligomeric polyisocyanates with their higher homologues. Trimerized HDI is available under the trademark of LUXATE, a product of Olin Corporation, as well as under the trademark Desmodur N-3300, a product of Miles Inc.

The active hydrogen-containing compound useful in the present invention is intended to include compounds that react to generate an active hydrogen-containing moiety such as imines, as well as conventional active-hydrogen containing compounds. The compound is suitably selected from the group consisting of monoahls, polyols, imines (such as kerimines and aldimines), oxazolidines, and combinations thereof, preferably having a weight average molecular weight of between about 30 and about 10,000, more preferably between about 100 and about 5,000, most preferably between about 200 and about 2,000.

The term "monoahl" is intended to designate compounds having only one active hydrogen group. An active hydrogen group is a group which has a hydrogen atom which, because of its position in the molecule, displays activity according to the Zerewitnoff test described by Woller in the Journal of American Chemical Society, Vol. 49, page 3181 (1927). Illustrative of such active hydrogen groups are —OH, —NH—, —COOH, —SH and —CONH—. Typical monoahls suitable for this invention include monoalcohols, monoamines, thiols, carboxylic acids, amides and imines.

Suitable monoalcohols are the aliphatic or cycloaliphatic alcohols, optionally containing ester or ether linkages. Preferred monoahls are monohydric polyethers and monohydric polyesters. Monohydric polyethers are prepared by the polymerization of alkylene oxides with alcohols. Alcohols which may be employed in the polymerization include $C_1$-$C_{30}$ (cyclo)aliphatic straight-or branched-chain alcohols, such as methanol, ethanol, propanol, isopropanol, butanol, hexanol, cyclohexanol, and the like, and mixtures thereof. Illustrative alkylene oxides used in the polymerization include ethylene oxide, propylene oxide, butylene oxide, and the like. Monohydric polyesters are most readily prepared by the polymerization of lactones such as butyrolactone, valerolactone, caprolactone, and the like with alcohols. Suitable alcohols include the alcohols described above for polymerization with alkylene oxides.

Suitable amines are aliphatic or cycloalphatic, primary or secondary amines. Preferred amines are poly(alkyleneoxy) alkylamines.

Polyols suitable for the present invention include polyether polyols and polyester polyols. The preferred polyols useful in the present invention have a hydroxyl functionality of no greater than about 2, more preferably less than 1.5, advantageously about 1, in order to prevent the formation of very high molecular weight polyurethane prepolymers which result in coating viscosities higher than desired for ready application. The polyether polyols are prepared by polymerization of alkylene oxides with water, polyhydric alcohols with two to eight hydroxyl groups, or amines. Polyester polyols include the condensation products of polycarboxylic acids with polyhydric alcohols.

In preparing the polyisocyanate prepolymers useful in the present invention, the ratio of NCO equivalents in the polyisocyanate to the OH equivalents in the active hydrogen-containing compound can vary over a wide range of between about 2:1 and about 10,000:1, preferably between about 2.5:1 and about 2,000:1, most preferably between about 3:1 and about 2,000:1.

Suitable catalysts for use in the process of the present invention are those which promote the water-isocyanate reaction including hydroxyl-free tertiary amine catalysts, as well as hydroxyl-containing tertiary amine catalysts. Suitable amine catalysts include the following: bis(N,N'-dimethyl aminoethyl)ether, tris(dimethylaminopropyl)amine, N,N'-dimethylpiperazine, pentamethyl,dipropylene triamine.

Preferred catalysts are hydroxyl-containing tertiary amines, including N,N'-dimethylethanolamine, N,N-dimethylamino-ethoxyethanol, N,N'-dimethylaminoethyl-N-methylethanolamine, N,N-dimethyl-N',N'-2-hydroxypropyl-1,3-propylene diamine, N,N,N'-trimethyl-N'-hydroxyethylbis(amino ethyl) ether, N,N-bis(3-dimethylaminopropyl) amino-2-propanol. The catalyst is suitably employed in an amount of between about 0.1% and about 5%, based upon the weight of the coating composition. Optionally, additional catalysts which promote polymer-forming reactions with the polyisocyanates, particularly reactions of the isocyanate with alcohol are suitably uses, and the use of these additional catalyst(s) is preferred. Such additional catalysts, for example dibutyltin dilaurate, and stannous octoate, are suitably employed in an amount of between about 0.01% and about 5%, preferably between about 0.01% and about 1%, by weight based upon the weight of the coating composition.

The coating compositions employed in the process of the present invention suitably contain small quantities of isocyanate-inert solvents in amounts of between 0% and 45% by weight, based upon the weight of the coating composition. It is preferred to minimize the amount of solvent utilized in the coating compositions of the present invention in order to minimize the VOC of the coating composition itself. However, some amount of solvent may be required in order to provide a desired low viscosity for the coating composition of less than about 200 seconds as measured by Zahn cup #2. Suitable solvents include toluene, xylene, butyl acetate, methyl ethyl ketone, methyl isobutyl ketone, methylamyl ketone, ethylethoxy propionate, ethoxyethylacetate, an aromatic hydrocarbon mixture having a boiling point of 152°–174° C., combinations thereof, and the like. Other optional additives are suitably employed, if desired, such as, for example, uv stabilizers; leveling agents; flow-aids; pigments, such as titanium dioxide; plasticizers; and/or other resins.

The coating compositions made in accordance with the process of the present invention are suitable for use in the production of clear or pigmented coatings, and may be applied to a desired substrate by conventional methods, such as spread coating, roller application or spraying. Because of the low viscosity of the compositions of the present invention, they are especially suitable for application by conventional spray techniques. The coating thickness on the substrate can vary over a wide range, although a dry film coating thickness of between about 0.01 and 0.5 millimeters is preferred.

Substrates for the coating useful in the present invention are suitably selected from a wide range of materials such as plastics, such as polyvinyl chloride, polyethylene or polystyrene, wood and paper substrates, and metal substrates, such as sheet steel or aluminum.

The coating compositions of the present invention are stable in storage when atmospheric moisture is excluded and they are suitably cured under the influence of moisture over a broad range of temperatures to form coatings. The moisture necessary for the reaction may be available as atmospheric moisture, although moisture may be supplied artificially, such as by steam in continuous plant processing or as a separate moisture additive in very dry climates where little atmospheric moisture is present. Hardening or curing of the coatings obtained from the use according to the invention is preferably carried out at room temperature with dry times of between about 30 minutes to about eight hours, but it may also be conducted at elevated temperatures. For example, temperatures in excess of 100° C., or even 150° C., may be utilized to obtain typical dry times of less than one hour.

The coatings of the present invention are suitable for use in the production of automotive clear coatings or undercoats, floor covering coatings, wall coatings, transportation coatings, maintenance coatings, and the like, or any other application where a low VOC coating composition is desired for use on a substrate.

The following examples are intended to illustrate, but in no way limit the scope of, the present invention.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLES

The following products were utilized in the examples given hereinbelow:

Monoahl A is a mixture of ethoxylated/ propoxylated C6-C10 alcohols having an average molecular weight of about 530.

Monoahl B is 2,2,4-trimethyl-1,3-pentanediol monoisobutyrate.

Polyol A is a poly(1,4-butanediol neopentyl glycol adipate) with an average molecular weight of about 800 and a hydroxyl number of 150 mg KOH/g.

Polyisocyanate A is a trimerized hexamethylene diisocyanate.

Monoahl C is a methoxypoly(oxyethylene/ oxypropylene)-2-propylamine having 0.55 meg/g of amine and sold under the trademark of Jeffamine M-2005, a product of Texaco.

Catalyst A is 2-((2-(2-(dimethylamino)ethoxy)ethyl)-methylamino)ethanol and sold under the trademark Texacat ZF-10, a product of Texaco.

Catalyst B is a 5% solution of dibutyltin dilaurate in toluene.

Flow-aid A is an acrylic flow and leveling agent sold as a 60% solids solution in xylene under the trademark Coroc A-620-A2, a product of Freeman Polymers.

EXAMPLE 1

A 500-ml, 3-necked flask was charged with 10 g of Monoahl A, 1.5 g of Catalyst A, 0.2 g of Catalyst B, 0.4 g of Flow-aid A, 21 g of butyl acetate (BA), and 21 g of ethylethoxypropionate (EEP). The flask was placed under positive nitrogen pressure while 90 g of Polyisocyanate A was added to the mixture. The resulting mixture was then heated to 80° C. and was stirred at the temperature for 3 hours to complete the reaction. The resultant coating composition had a viscosity of 28 seconds by No. 2 Zahn cup at 20° C. The coating composition contained 29.1% solvent by weight.

Examples 2–12

Using the procedure described in Example 1 the following coating compositions were prepared.

EXAMPLE 13

A 500-ml, 3-necked flask was charged with 90 g of Polyisocyanate A, 2.73 g of Catalyst A, 0.7 g of Flow-aid A, 35 g of butyl acetate, and 35 g of ethylethoxypropionate. The flask was placed under positive nitrogen pressure while 92 g of Monoahl C were added to the stirring mixture in a dropwise manner. The temperature of the reaction mixture exothermically increased to 32° C. and then gradually decreased to 28° C. when the reaction was complete. The resultant coating composition had a viscosity of 47 seconds by No. 2 Zahn cup at 20° C. The coating composition contained 27.4% solvent by weight.

TABLE 1

| EXAMPLE | POLYISOCYANATE A AMOUNT (g) | TYPE OF MONOAHL | MONOAHL AMOUNT (g) | POLYOL A AMOUNT (g) | CATALYST A AMOUNT (g) | CATALYST B AMOUNT (g) | BA AMOUNT (g) | EEP AMOUNT (g) | FLOW-AID A AMOUNT (g) | VISCOSITY ZAHN #2 (sec) | SOLVENT WEIGHT % |
|---|---|---|---|---|---|---|---|---|---|---|---|
| 2 | 600 | A | 150 | 0 | 11.25 | 1.5 | 150 | 150 | 3 | 28 | 28.1% |
| 3 | 70 | A | 30 | 0 | 1.5 | 0.2 | 21 | 21 | 0.4 | 68 | 29.1% |
| 4 | 60 | A | 40 | 0 | 1.5 | 0.2 | 21 | 21 | 0.4 | 34 | 29.1% |
| 5 | 90 | A | 10 | 0 | 1.5 | 0.2 | 21 | 21 | 0.4 | 26 | 29.1% |
| 6 | 70 | A | 30 | 0 | 1.5 | 0.2 | 21 | 21 | 0.4 | 26 | 29.1% |
| 7 | 90 | B | 4.1 | 0 | 1.4 | 0.18 | 18 | 18 | 0.37 | 31 | 27.3% |
| 8 | 60 | B | 6.6 | 0 | 1 | 0.13 | 14 | 14 | 0.26 | 35 | 29.2% |
| 9 | 90 | B | 15.7 | 0 | 1.6 | 0.2 | 20 | 20 | 0.4 | 41 | 27.0% |
| 10 | 90 | B | 24.4 | 0 | 1.7 | 0.22 | 22 | 22 | 0.45 | 47 | 27.4% |
| 11 | 90 | NT* | 0 | 6.8 | 1.4 | 0.19 | 18.5 | 18.5 | 0.38 | 48 | 27.3% |
| 12 | 70 | NT* | 0 | 20 | 1.3 | 0.18 | 17 | 17 | 0.36 | 185 | 27.0% |

*"NT" denotes "not tested".

EXAMPLES 14–26

The coating compositions prepared in Examples 1–13 were sprayed at 45 psi using a conventional spray gun (model #DH6500 from Binks Mfg. Co.) on cold-rolled steel panels. A small portion of the coating composition was used to coat a glass strip which was placed in a BK Drying Recorder (Paul N. Gardner Company, Inc.) to determine the drying time. The recorder uses a tracking needle to determine the solvent evaporation time, the gel time, and the surface-dry time. The drying time determinations were made at 20° C. and 50% relative humidity.

The coated test panels were allowed to cure at ambient temperature and humidity conditions for two weeks before testing for appearance, mechanical properties, and chemical resistance. Pencil hardness was determined according to ASTM D3363-92a. The conical mandrel bend tests were performed using a one-eight inch tester from BYK-Gardner, Inc. according to ASTM D522-92. Direct and reverse impact values were determined according to ASTM D2794-92 using a variable height impact tester from BYK-Gardner, Inc. Gloss was determined using a micro-TRZ-gloss, multi-angle glossmeter from BYK-Gardner, Inc. Cross-hatch adhesion was determined using a cross-hatch cutter from BYK-Gardner according to ASTMD3359-92a. Chemical resistance was determined according to ASTM D1308-87. Although most of the coatings properties show in the table are acceptable for a wide variety of applications, those showing a poor result in one or two properties would be suitably utilized in applications not requiring those properties.

TABLE 2

SOLVENT

TABLE 2-continued

| EXAMPLE | COATING COMPOSITION | EVAPORATION (min) | GEL TIME (min) | SURFACE DRY (min) | THICKNESS (mils) | PENCIL HARDNESS | MANDREL BEND | DIRECT IMPACT (in/lb) | REVERSE IMPACT (in/lb) |
|---|---|---|---|---|---|---|---|---|---|
| 14 | Example 1 | 15 | 45 | 120 | 2 | 4 | PASS | >160 | 140 |
| 15 | Example 2 | 15 | 30 | 120 | 2 | 4 | PASS | >160 | >160 |
| 16 | Example 3 | 15 | 30 | 82 | 2 | 3 | PASS | >160 | >160 |
| 17 | Example 4 | 15 | 30 | 75 | 2 | 2 | PASS | >160 | >160 |
| 18 | Example 5 | 15 | 30 | 120 | 2 | 4 | PASS | >160 | >160 |
| 19 | Example 6 | 255 | 315 | >360 | 1.2 | 3 | PASS | >160 | >160 |
| 20 | Example 7 | 20 | 30 | 180 | 1.4 | 5 | PASS | >160 | >160 |
| 21 | Example 8 | NT* | NT* | NT* | 1.2 | 5 | PASS | >160 | >160 |
| 22 | Example 9 | 15 | 45 | 255 | 2.3 | 4 | PASS | >160 | >160 |
| 23 | Example 10 | NT* | NT* | NT* | 1.5 | 4 | PASS | >160 | >160 |
| 24 | Example 11 | 20 | 45 | 135 | 1.4 | 5 | PASS | >160 | >160 |
| 25 | Example 12 | 15 | 20 | 90 | 1.7 | 4 | PASS | >160 | >160 |
| 26 | Example 13 | 30 | 70 | 180 | 1.7 | <2 | PASS | >160 | >160 |

| EXAMPLE | COATING COMPOSITION | GLOSS (60°) | GLOSS (20°) | CROSSHATCH ADHESION | CHEMICAL RESISTANCE | | | MEK RUB | XYLENE RUB |
|---|---|---|---|---|---|---|---|---|---|
| | | | | | NaOH (10%) | HCl (10%) | CH3COOH (10%) | | |
| 14 | Example 1 | 106% | 87% | PASS | PASS | PASS | PASS | PASS | PASS |
| 15 | Example 2 | 95% | | PASS | PASS | PASS | PASS | PASS | PASS |
| 16 | Example 3 | 90% | 64% | PASS | PASS | FAIL | FAIL | PASS | PASS |
| 17 | Example 4 | 89% | 84% | PASS | PASS | FAIL | FAIL | PASS | PASS |
| 18 | Example 5 | 93% | 99% | PASS | PASS | PASS | FAIL | PASS | PASS |
| 19 | Example 6 | 102% | 82% | PASS | PASS | FAIL | FAIL | PASS | PASS |
| 20 | Example 7 | 106% | 92% | PASS | PASS | PASS | PASS | PASS | PASS |
| 21 | Example 8 | 110% | 96% | PASS | PASS | PASS | PASS | PASS | PASS |
| 22 | Example 9 | 90% | 45% | PASS | PASS | PASS | PASS | PASS | PASS |
| 23 | Example 10 | 105% | 97% | PASS | PASS | PASS | PASS | PASS | PASS |
| 24 | Example 11 | 91% | 52% | PASS | PASS | FAIL | FAIL | PASS | PASS |
| 25 | Example 12 | 104% | 90% | PASS | PASS | PASS | FAIL | PASS | PASS |
| 26 | Example 13 | 24% | 17% | PASS | PASS | FAIL | FAIL | PASS | PASS |

*"NT" denotes "not tested".

What is claimed is:

1. A process for coating a substrate which comprises contacting said substrate with a low volatile organic compound-containing coating composition having a viscosity as measured by ZAHN cup 2 of less than about 200 seconds and consisting essentially of at least one polyisocyanate prepolymer which is the reaction product of a polyisocyanate with a monoahl or a combination of monoahls a solvent in an amount of between 0% and 45% by weight based upon the amount of said composition, and a tertiary amine catalyst, said composition being essentially free of any volatile mono- and diisocyanates, and said composition being moisture curable upon exposure to atmospheric moisture.

2. The process of claim 1 wherein said coating composition is solvent-free.

3. The process of claim 1 wherein said solvent is selected from the group consisting of toluene, xylene, butyl acetate, methyl ethyl ketone, methyl isobutyl ketone, methylamyl ketone, ethoxyethylacetate, ethylethoxy propionate, aromatic hydrocarbon mixtures having a boiling point of between 152° C. and 174° C., and combinations thereof.

4. The process of claim 1 wherein said polyisocyanate has an average functionality of least 2.

5. The process of claim 4 wherein said average functionality is between 2.5 and 6.

6. The process of claim 1 wherein said polyisocyanate is selected from the group consisting of aliphatic or cycloaliphatic polyisocyanates, and combinations thereof.

7. The process of claim 1 wherein said polyisocyanate contains a moiety selected from the group consisting of biuret, uretidione, isocyanurate, urethane, allophanate, and combinations thereof.

8. The process of claim 6 wherein said polyisocyanate is an aliphatic polyisocyanate prepared from hexamethylene diisocyanate.

9. The process of claim 1 wherein said polyisocyanate is selected from the group consisting of tris-(isocyanatohexyl)-biuret, tris-(isocyanatohexyl)-isocyanurate, cyclodimerized isocyanate and combinations thereof, as well as higher oligomers.

* * * * *